US010133018B2

(12) United States Patent
Carberry et al.

(10) Patent No.: US 10,133,018 B2
(45) Date of Patent: Nov. 20, 2018

(54) OPTICAL FIBER CABLE WITH CRUSH RESISTANT, KINK RESISTANT BUFFER TUBE

(71) Applicant: Corning Optical Communications LLC, Hickory, NC (US)

(72) Inventors: Joel Patrick Carberry, Big Flats, NY (US); David Wesley Chiasson, Edmonton (CA); Jeffrey Dean Danley, Hickory, NC (US); Anping Liu, Horseheads, NY (US); Barada Kanta Nayak, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/690,750

(22) Filed: Aug. 30, 2017

(65) Prior Publication Data

US 2018/0059350 A1    Mar. 1, 2018

Related U.S. Application Data

(60) Provisional application No. 62/381,815, filed on Aug. 31, 2016.

(51) Int. Cl.
*G02B 6/44* (2006.01)
*B23K 26/364* (2014.01)
*B23K 101/04* (2006.01)

(52) U.S. Cl.
CPC .......... *G02B 6/4432* (2013.01); *B23K 26/364* (2015.10); *G02B 6/4413* (2013.01); *G02B 6/4486* (2013.01); *B23K 2201/04* (2013.01)

(58) Field of Classification Search
None
See application file for complete search history.

(56) References Cited

U.S. PATENT DOCUMENTS

2005/0281517 A1* 12/2005 Wessels, Jr. ......... G02B 6/4429
385/109
2010/0126665 A1* 5/2010 Cale ................... B23K 26/0676
156/272.8
2013/0236148 A1 9/2013 Bohler et al.
(Continued)

FOREIGN PATENT DOCUMENTS

CA    2548267 C    3/2014
CN    103867814 A    6/2014
(Continued)

OTHER PUBLICATIONS

International Search Report and Written Opinion of the International Searching Authority; PCT/US2017/048794 dated Dec. 26, 2017; 14 Pages; ISA/US Commissioner for Patents.

*Primary Examiner* — Jerry Rahll
(74) *Attorney, Agent, or Firm* — William D. Doyle (57) ABSTRACT

A crush resistant, kink resistant optical cable including crush resistant, kink resistant optical fiber buffer tubes and systems and method for making the same are provided. The buffer tubes include a depression pattern formed along the outer surface of the buffer tube. The depression pattern provides areas of decreased thickness in the buffer tube facilitating flexibility and kink resistance. The system and method relates to laser ablation for forming the depression pattern in the buffer tube.

4 Claims, 4 Drawing Sheets

(56) References Cited

U.S. PATENT DOCUMENTS

| | | | | |
|---|---|---|---|---|
| 2014/0119699 A1* | 5/2014 | Keller | ................... | G02B 6/443 |
| | | | | 385/102 |
| 2015/0153511 A1* | 6/2015 | Baca | ................... | G02B 6/4482 |
| | | | | 29/428 |
| 2015/0218038 A1* | 8/2015 | Carberry | ................ | C03B 37/16 |
| | | | | 65/392 |
| 2016/0054531 A1 | 2/2016 | Baca et al. | | |

FOREIGN PATENT DOCUMENTS

| | | |
|---|---|---|
| WO | 2015106859 A1 | 7/2015 |
| WO | 2016039952 A2 | 3/2016 |

\* cited by examiner

OPTICAL FIBER CABLE WITH CRUSH RESISTANT, KINK RESISTANT BUFFER TUBE

RELATED APPLICATIONS

This application claims the benefit of U.S. Provisional Application No. 62/381,815, filed Aug. 31, 2016, which is incorporated by reference herein in its entirety.

BACKGROUND

The disclosure relates generally to optical communication cables and more particularly to optical communication cables including an optical fiber containing tube (e.g., a buffer tube) that is shaped or otherwise configured to reduce deformation under crush events and reduce kinking during bend events. Optical communication cables have seen increased use in a wide variety of electronics and telecommunications fields. Optical communication cables contain or surround one or more optical communication fibers. The cable provides structure and protection for the optical fibers within the cable. Within a cable, optical fibers may be located within a polymer tube, such as a buffer tube.

SUMMARY

One embodiment of the disclosure relates to a crush and kink resistant optical cable. The cable includes a cable jacket including an inner surface defining a channel within the cable jacket. The cable includes a plurality of buffer tubes located in the channel of the cable jacket, and each of the buffer tubes includes an outer surface, an inner surface and a bore defined by the inner surface of the buffer tube. The cable includes a plurality of optical fibers located within the bore of each of the buffer tubes. Each of the buffer tubes includes a depression pattern formed along the outer surface of the buffer tube such that a thickness, T1, of the buffer tube measured in the radial direction between the inner surface and the outer surfaces within the depression is less than a thickness, T2, of the buffer tube measured in the radial direction between the inner surface and the outer surfaces outside of each of the depressions.

An additional embodiment of the disclosure relates to an elongate optical transmission element and includes a polymeric tube. The polymeric tube includes a first layer formed from a first material, and the first layer has a first average thickness, T1. The polymeric tube includes an inner surface of the first layer and a bore defined by the inner surface of the first layer. The polymeric tube includes a second layer located around and outside of the first layer and formed from a second material. The polymeric tube includes an outermost surface defined by the second material of the second layer. The polymeric tube includes a recessed portion formed along the outermost surface of the polymeric tube. The recessed portion defines a floor surface recessed a depth, d, below the outermost surface, and the recessed portion extends in the circumferential direction and forms a pattern that repeats along the length of the outermost surface of the polymeric tube. The second layer has a second average thickness, T2, in areas outside of the recessed portion, and d is between $0.25*T2$ and $1.25*T2$; T2 is between $0.25(T1+T2)$ and $0.75 (T1+T2)$. The first material has a modulus of elasticity that is less than the modulus of elasticity of the second material. The elongate optical transmission element includes a plurality of optical fibers located within the bore of the polymeric tube.

An additional embodiment of the disclosure relates to a method of forming an elongate optical transmission element. The method includes moving a buffer tube surrounding an optical fiber into a laser ablation station. The method includes directing a laser beam toward an outer surface of the buffer tube. The method includes removing portions of buffer tube with the laser beam forming a depression pattern along the outer surface of the buffer tube.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) and an optical fiber carrying tube, such as a buffer tube, are shown. In general, the buffer tube acts to protect the optical fibers under the wide variety of forces that the cable may experience during manufacture, installation, handling, in use, etc. As discussed in more detail below, the buffer tubes discussed herein have a pattern of recesses or depressions formed in the outer surface of the tube that provides both strength/rigidity to limit tube deformation during crush event and that also provides tube flexibility which limits kinking of the tube during cable bending. Typically, it is understood that designs that improve buffer tube crush performance decreases kink performance and vice versa. However, the buffer tube design discussed herein provides both high levels of crush-resistance and kink-resistance while also maintaining a relatively low buffer tube wall thickness and relatively small outer diameter.

For example, it is believed that by utilizing a tube that resists deformation during crush events, the fiber and the outer coating of optical fibers, particularly at the fiber cross-overs, are protected, and damage is resisted or prevented which in turn may decrease the signal attenuation experienced within the optical fiber following the crush event. Similarly by limiting buffer tube kink formation during bending, damage to optical fibers that may otherwise occur during bending is resisted.

In specific embodiments, the surface depression pattern is a laser ablated depression pattern. In such embodiments, a laser (e.g., as opposed to a contact-based cutting process or a molding process) is used to remove portions of the buffer tube along its outer surface to form the depression pattern. Applicant believes that a laser-ablated surface depression pattern may be formed with enough precision to provide the combination crush-resistance, kink-resistance to a buffer tube despite the relatively small diameter and relatively small wall thickness of the buffer tube.

In additional embodiments, the surface depression patterns discussed herein are utilized in combination with a multi-layered buffer tube to provide superior crush and kink performance and/or smaller outer diameter than Applicant believes achievable utilizing other designs, such as a multi-layered buffer tube without the surface depression pattern discussed herein. In such embodiments, the buffer tube may include a material of relatively elastic material (e.g., lower Young's modulus of elasticity) forming an inner layer of the buffer tube that contacts the optical fibers within the tube and a more rigid material (e.g., high Young's modulus of elasticity) forming the outer layer of the buffer tube. In this arrangement, the lower modulus material of the inner layer acts to cushion the optical fibers during crush or bend events, while the rigid outer material provides deformation resistance during crush events. Then, in combination with the surface depression pattern discussed herein, kink resistance is provided to the buffer tube despite the use of the relatively rigid material for the outer layer of the buffer tube. Applicant believes that by utilizing the surface depression patterns discussed herein, particularly when used in combination with a multilayer buffer tube, a high level of buffer tube performance (e.g., crush resistance, low level of kinking, low levels of fiber damage, etc.) can be achieved while also decreasing the overall outer tube diameter and/or tube wall thickness.

In yet additional embodiments, a method and system for forming the depression patterns discussed herein via laser ablation are provided. Applicant believes that utilizing laser ablation (in contrast to cutting or molding techniques) allows for formation of depressions providing the flexibility and kink-resistance discussed herein despite the small buffer tube size. In addition, the laser ablation method and system discussed herein is easily configurable to form a wide variety of surface depression patterns (e.g., without having to cut new tools/molds). In addition, Applicant believes that production speed of buffer tubes using the laser ablation system/method discussed herein is superior to either potential physical cutting or molding techniques.

Figure 1:
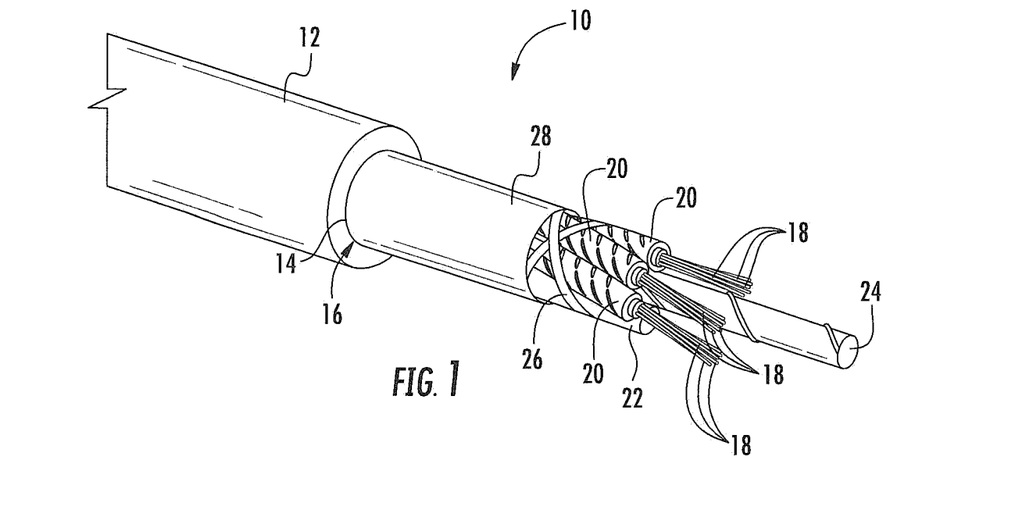
FIG. 1 is a perspective view of an optical fiber cable according to an exemplary embodiment.

Referring to FIG. 1, an optical cable, such as cable 10, is shown according to an exemplary embodiment. Cable 10 includes a cable body, shown as cable jacket 12, having an inner surface 14 that defines a channel, shown as central bore 16. Groups of optical fibers 18 are located within tubes, shown as buffer tubes 20, and buffer tubes 20 are located within bore 16 of cable jacket 12. As shown, buffer tubes 20 each define a central bore or channel and optical fibers 18 are located in the buffer tube central channel.

In various embodiments, cable jacket 12 may be a made from a wide variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

In various embodiments, the optical fibers 18 can include a wide variety of optical fibers including multi-mode fibers, single mode fibers, bend insensitive fibers, multi-core optical fibers, etc. Generally, cable 10 provides structure and protection to optical fibers 18 during and after installation (e.g., protection during handling, protection from elements, protection from vermin, etc.). In some embodiments, cable 10 may include other elements, such filler rods 22 located within bore 16. Filler rods 22 and buffer tubes 20 are arranged around an elongate rod, shown as central strength member 24, that is formed from a material such as glass-reinforced plastic or metal (e.g., steel). In some embodiments, cable 10 includes buffer tubes 20 at all positions around central strength member 24, and in such embodiments, cable 10 includes no filler-rods 22.

In general, buffer tubes 20 (and filler rods 22 if present) are wrapped around central strength member 24. In the embodiment shown, filler rods 22 and buffer tubes 20 are shown in a helical stranding pattern, such as an SZ stranding pattern, around central strength member 24. Helically wound binders 26 are wrapped around buffer tubes 20 and filler rods 22 to hold these elements in position around strength member 24. In some embodiments, a thin-film, extruded sheath may be used in place of binders 26. A barrier material, such as water barrier 28, is located around the wrapped buffer tubes 20 and filler rods 22. In various embodiments, cable 10 may include a reinforcement sheet or layer, such as a corrugated armor layer, between layer 28 and jacket 12, and in such embodiments, the armor layer generally provides an additional layer of protection to optical fibers 18 within cable 10, and may provide resistance against damage (e.g., damage caused by contact or compression during installation, damage from the elements, damage from rodents, etc.). In some embodiments, designed for indoor applications, cable 10 may include fire resistant materials, such as fire resistant materials embedded in jacket 12 and/or fire resistant intumescent particles located within channel 16.

Figure 2:
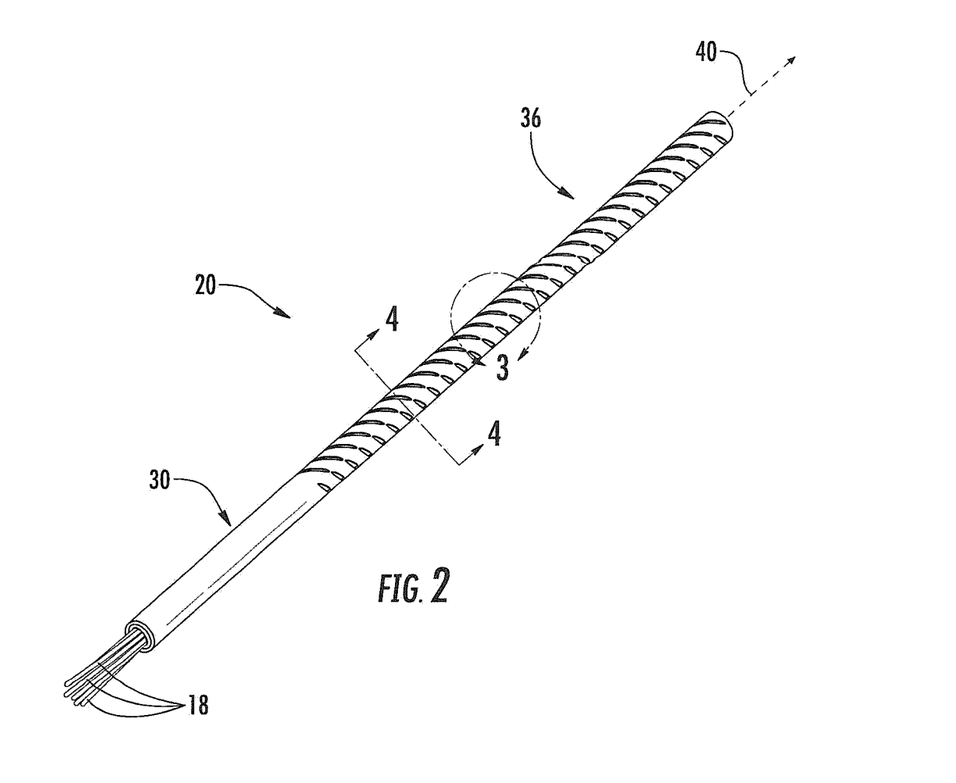
FIG. 2 is a perspective view of a buffer tube of the cable of FIG. 1 according to an exemplary embodiment.
Figure 3:
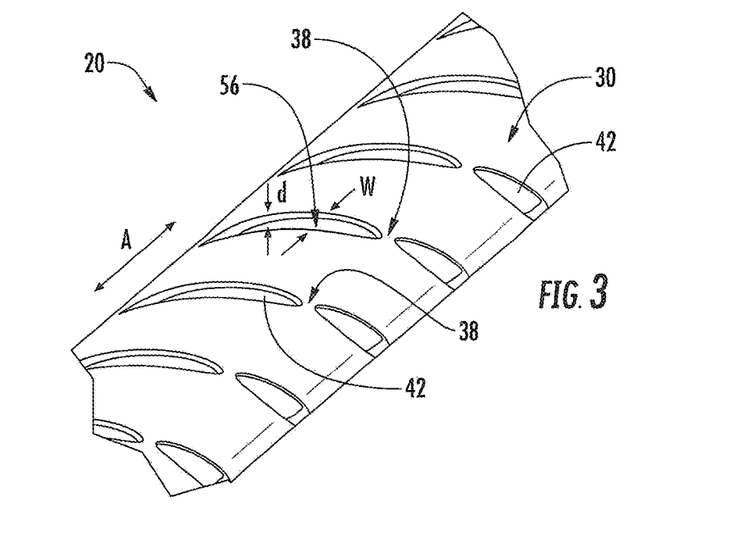
FIG. 3 is a detailed perspective view of the outer surface of the buffer tube of FIG. 2 showing a depression pattern according to an exemplary embodiment.
Figure 4:
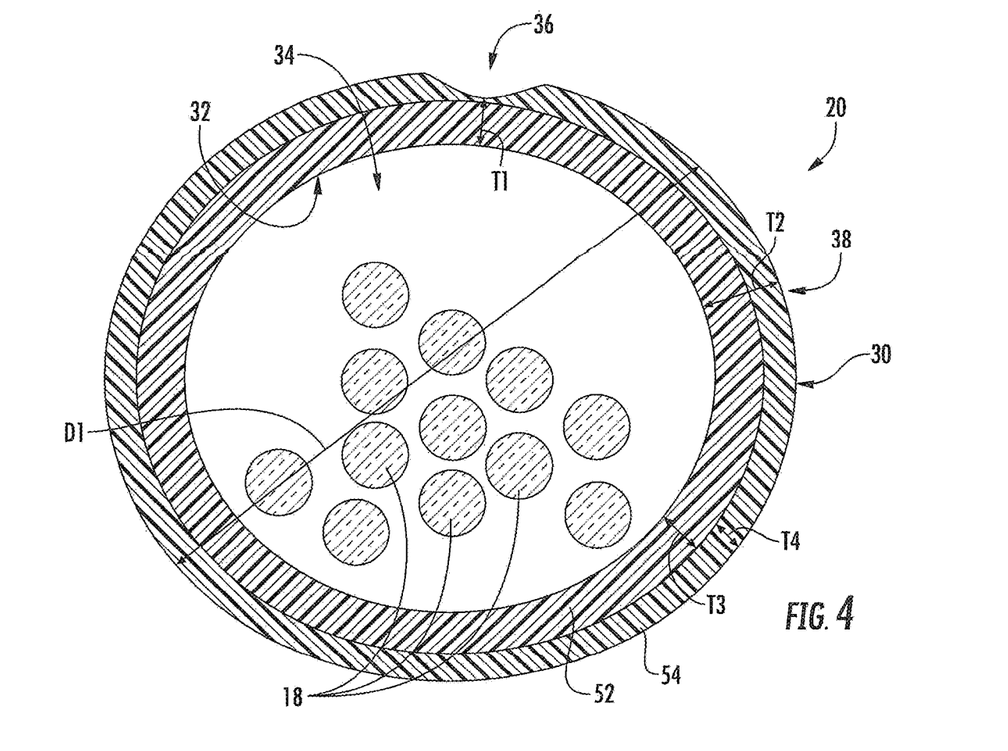
FIG. 4 is a cross-sectional view of the buffer tube of FIG. 2 according to an exemplary embodiment.

Referring to FIGS. 2-4, buffer tube 20 is shown in detail according to an exemplary embodiment. Buffer tube 20 includes an outer surface 30 that defines the exterior surface of the buffer tube. As shown in FIG. 4, buffer tube 20 includes an inner surface 32 that defines a channel, shown as central bore 34, and optical fibers 18 are located within central bore 34. In the specific embodiment shown, optical fibers 18 may be loosely packed within buffer tube 20 (e.g., a "loose buffer"), and in such embodiments, cable 10 is a loose tube cable. In various embodiments, central bore 34 may include additional materials, including water blocking materials, such as water swellable gels, tensile strength elements, such as Kevlar yarns, water blocking yarns, etc.

As shown in FIGS. 1-3, buffer tube 20 includes a recess or depression pattern, shown as helical depression pattern 36, formed along outer surface 30 of buffer tube 20. In general, the depression patterns discussed herein are formed from one or more region or area that is recessed below a portion of outer surface 30 adjacent and outside of the depression which results in a thinner area of the buffer tube at the site of the depression(s). Specifically, as shown in FIG. 4, buffer tube 20 has a minimum radial wall thickness (e.g., the radial distance between inner surface 32 and outer surface 30) at the site of depression pattern 36, shown as T1, and an average radial wall thickness (e.g., the radial distance between inner surface 32 and outer surface 30) at areas 38 outside of depression pattern 36, shown as T2. As shown, T1 is less than T2 such that buffer tube 20 is thinner at depression pattern 36 than at areas 38 outside of depression pattern 36, and in specific embodiments, T1 is less than 90% of T2. This thinned portion of the buffer tube provides a zone of increased flexibility that tends to bend during cable bending, rather than to develop a kink, as may occur with buffer tubes formed from a rigid crush-resistant material that have consistent outer diameters (e.g., without depressions).

Referring to FIG. 3, in the exemplary embodiment shown, helical depression pattern 36 includes one or more depressions that are positioned to follow a helical or spiral path around the outer surface 30 of each buffer tube 20. In this embodiment, the major axes of the depressions of helical depression pattern extend both in the circumferential direction around outer surface 30 of buffer tube 20 and in the longitudinal direction (e.g., in the direction of axis 40) of buffer tube 20. In this pattern, the major axes of the depressions define an interior angle relative to longitudinal axis 40 that is greater than zero degrees and less than 90 degrees, specifically that is between 5 degrees and 85 degrees, and more specifically that is between 10 degrees and 80 degrees.

As shown best in FIG. 3, in one embodiment, helical depression pattern 36 is formed from a plurality of discreet depressions 42 that are formed in outer surface 30 of buffer tube 20. As shown, depressions 42 are positioned on outer surface 30 such that depressions are aligned or arranged in a helical shaped pattern extending around the circumference of the outer surface of buffer tube 20. In the specific embodiment shown, depressions 42 are an elongate shape, such as an elongate elliptical shape, an elongate oval shape, an elongate rectangular shape, etc., and the major axes of the elongate depressions 42 are aligned in the helical shape around the outer surface 30 of buffer tube 20. In this arrangement of discreet depressions 42, unrecessed areas 38 are located between and separating the distinct depressions 42 from each other along the helical path defined by helical depression pattern 36. In the specific embodiment shown, each depression 42 of depression pattern 36 has the same general shape and dimensions as each other, and in other embodiments, depressions 42 may have a variety of depression shapes and/or dimensions as may be desired for a particular application.

In various embodiments, each depression 42 is sized relative to the helical path such that there are at least two depressions 42 per twist of the helix. In a specific embodiment, each depression 42 is sized relative to the helical path such that there are at least 3, at least 4, at least 5, at least 6, at least 7, at least 8, etc. depressions 42 per twist of the helix.

In some embodiments, buffer tube 20 is a tube formed from a single material, and in other embodiments as shown in FIG. 4, buffer tube 20 is formed from more than one layer of material. As shown in FIG. 4, in specific embodiments, buffer tube 20 is a multi-layered buffer tube having a variety of layers to provide different performance characteristics. In the embodiment shown in FIG. 4, buffer tube 20 has multiple layers of material forming buffer tube 20. In the embodiment shown, buffer tube 20 has a first layer, shown as inner layer 52, and a second layer, shown as outer layer 54. The inner surface of inner layer 52 defines inner surface 32 and central bore 34, and outer layer 54 includes an outer surface that defines buffer tube outer surface 30. In contrast to some optical cable elements that use a corrugated structure (e.g., corrugated dielectric armor layers, corrugated armor layers, etc.), inner layer 52 defines an inner surface 32 that is a substantially cylindrical or smooth surface that is substantially devoid of corrugations, recesses, etc.

As shown, inner layer 52 is a substantially contiguous and continuous layer of material surrounding optical fibers 18, and outer layer 54 is a substantially contiguous and continuous layer of material located outside of and surrounding inner layer 52. In the two-layer embodiment of FIG. 4, inner layer 52 and outer layer 54, combined, define the radial thickness T2 of buffer tube 20 as discussed above.

In general, because inner layer 52 defines the inner surface of buffer tube 20 and will contact optical fibers 18 under loading, inner layer 52 is formed from a compliant, elastic and/or protective polymer material. In addition, outer layer 54 is formed from a relatively rigid polymer material, different from the material of inner layer 52, that limits deformation during crush events. Thus, in general, the material of inner layer 52 has a Young's modulus of elasticity that is less than the Young's modulus of elasticity of the material of outer layer 54.

In various embodiments, inner layer 52 may be formed from a variety of suitable materials including polyethylene, high density polyethylene, polypropylene, various thermoplastic elastomers, elastomeric PVC material, etc. In various embodiments, outer layer 54 may be made from any polymer suitable for buffer tube construction having the rigidity or high modulus discussed above. In various embodiments, outer layer 54 is formed from a polymer material including one or more of a polyethylene material, a high density polyethylene material, a polypropylene material, a polycarbonate (PC) material, a polybutylene terephthalate (PBT), polyamide (PA), polyoxymethylene (POM), poly(ethene-co-tetrafluoroethene) (ETFE), etc. In various embodiments, inner layer 52 is formed from a material that forms a bond with the material of outer layer 54 during coextrusion. In embodiments in which outer layer 54 is a polyolefin, such as polypropylene, inner layer 52 may be formed from a thermoplastic olefin material or an elastomeric alloy material to facilitate bonding during coextrusion.

Referring to FIG. 4, buffer tube 20 has an average outer diameter measured at unrecessed areas 38 shown as D1. In various embodiments, D1 is between 1 mm and 3 mm. As noted herein, the system and process discussed herein is capable of forming the relatively complex and precise depression pattern 36 despite the small size of buffer tube 20.

Further, inner layer 52 has a thickness in the radial direction, shown as T3, and outer layer 54 has a thickness in the radial direction, shown as T4. As noted above, T3 and T4 together account for the total thickness of buffer tube, T2. In various embodiments, T3 is between 25% and 75% of total average buffer tube thickness T2. Stated differently, in various embodiments, T3 is between 0.25*(T3+T4) and 0.75(T3+T4). As noted herein, the system and process discussed herein is capable of forming the relatively complex and precise depression pattern 36 despite the low thickness of buffer tube 20.

Referring to FIG. 3, dimensions of depressions 42 are shown in more detail. Each depression 42 defines a floor surface 56 recessed a depth, d, below the outermost surface 30 at unrecessed areas 38. Thus depth, d, is the radial distance between floor surface 56 and the adjacent outermost surface 30, as shown in FIG. 4. In addition to depth, each depression 42 defines a depression width, W, measured between leading and trailing edges of the depression pattern or individual depressions in the longitudinal direction. Further, helical depression pattern 36 defines an average pitch length A, which is the distance in the longitudinal direction between adjacent turns in the pattern.

In various embodiments, pitch length A, depth d and or width W are specifically selected to provide the desired level of flexibility and kink resistance to buffer tube 20 while also preserving the high crush-resistance provided by the rigid material of outer layer 54. In specific embodiments, d is between 0.25*T4 and 1.25*T4. In specific embodiments, W is between 0.25*T4 and 1.25*T4. In specific embodiments, A is between 0.5*D1 and 2*D1, where D1 is the buffer tube outer diameter D1.

As discussed in more detail below, in various embodiments, depression pattern 36 is formed via laser ablation which Applicant believes facilitates precise formation of depression pattern 36 having the various dimensions discussed herein despite being formed on the relatively small surface area of buffer tube 20. Applicant further believes that utilizing contact cutting, contact abrading methods, contact embossing methods or molding methods to form depression pattern 36 may provide an inferior buffer tube, include less dimensional control of the depressions in pattern 36, increased rate of buffer tube damage or cracking during pattern formation, and decreased buffer tube production speed.

Thus, in specific embodiments, depression pattern 36 is a pattern of laser ablated depressions formed in outer surface 30 of buffer tubes 20. In such embodiments, depressions 42 include one or more feature or characteristic that is believed to be unique, laser ablated depressions as compared to contact-cut structures and/or molded structures. For example, in one embodiment, depressions 42 have rounded/smooth edges at the transition to adjacent areas 38 and a rounded/smooth surface at the bottom of floor 56 indicative of the melting that occurs during laser ablation. In other embodiments, the walls and/or floor 56 of depressions 42 are smooth and devoid of abrasion marks indicative of a contact based removal process. In other embodiments, the surface of the material within depressions 42 has a different (e.g., higher) level oxidized polymer than is present on the surface of the material within areas 38. This is believed to be a result of oxidation caused by the high energy levels/high temperatures experienced within portions material of buffer tube 20 during interaction with the ablation laser.

Figure 5:
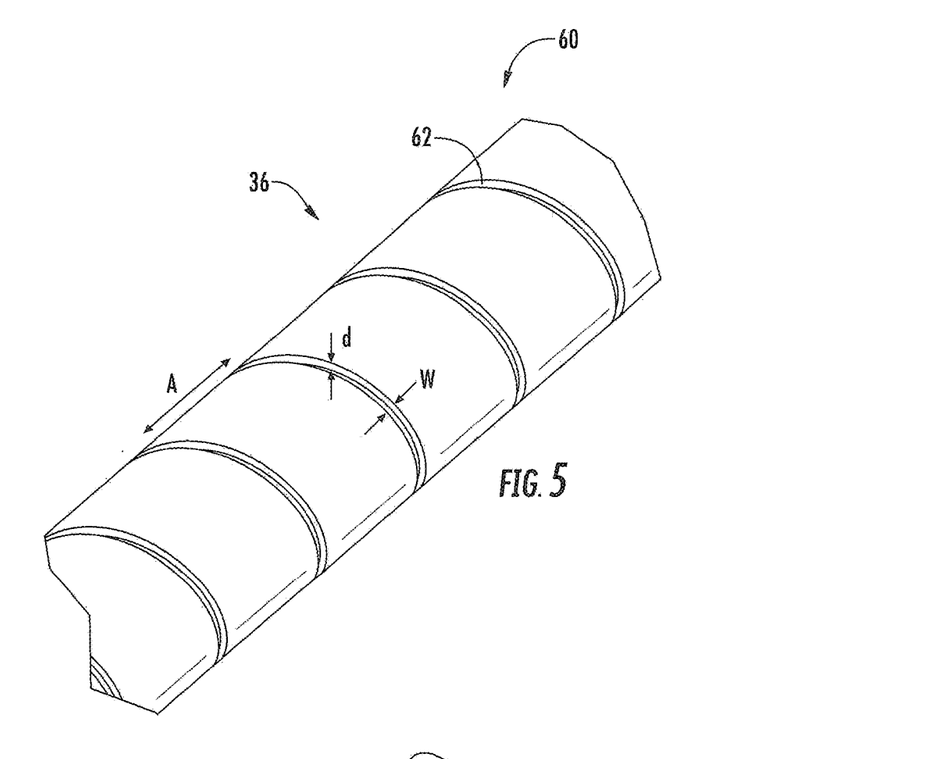
FIG. 5 is a detailed perspective view of a buffer tube showing a depression pattern according to another exemplary embodiment.

Referring to FIG. 5, a buffer tube 60 is shown according to another exemplary embodiment. Buffer tube 60 is substantially the same as buffer tube 20 except as discussed herein. Buffer tube 60 includes a helical depression pattern 36. However, in contrast to buffer tube 20, buffer tube 60 includes a single, contiguous helical channel or depression 62 forming depression pattern 36. In general, contiguous depression 62 is substantially the same as depressions 42, except that depression 62 is contiguous and continuous such that there are no unrecessed regions 38 located along at least one complete turn of the helical path of the pattern. In one specific embodiment, contiguous depression 62 extends, unbroken in the helical pattern around the circumference of outer surface 30 and along the entire length of buffer tube 60, and in such embodiments, the unbroken contiguous helix provides buffer tube 60 with complete axisymmetric bend and compression properties.

Figure 6:
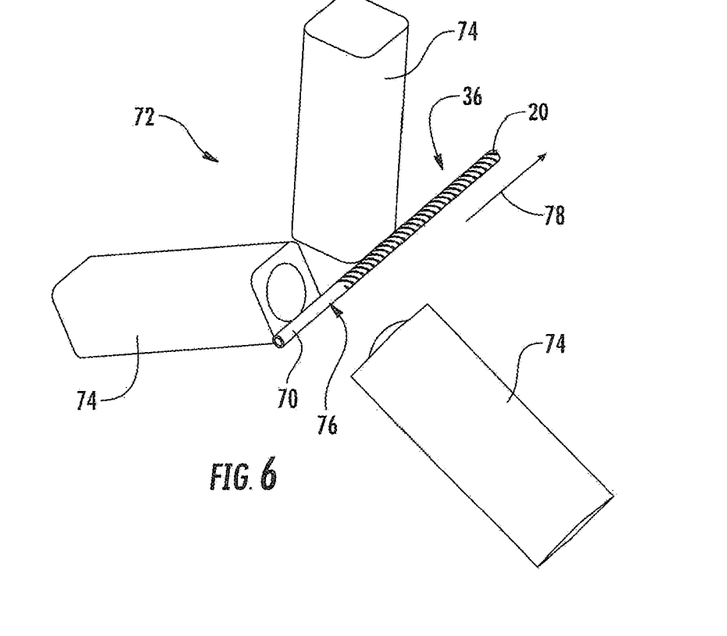
FIG. 6 shows a system and method for forming a depression pattern on a buffer tube according to an exemplary embodiment.
Figure 7:
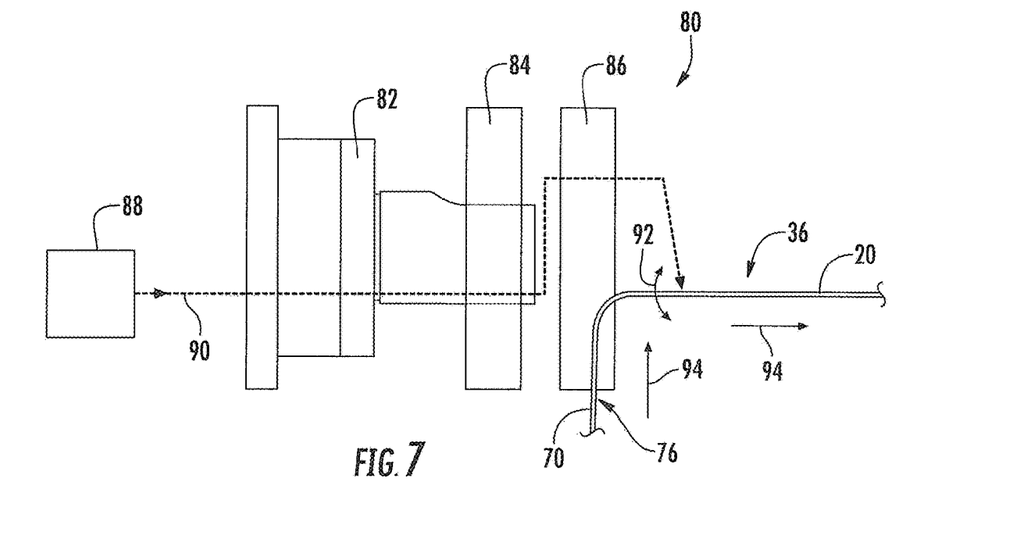
FIG. 7 shows a system and method for forming a depression pattern on a buffer tube according to another exemplary embodiment.

Referring to FIG. 6 and FIG. 7, various embodiments of systems and method for forming depression patterns, such as depression pattern 36, are shown and described. Referring to FIG. 6, in general to form a buffer tube 20 or buffer tube 60, a blank, unpatterned buffer tube 70 is moved into a laser ablation station 72. Lasers, shown as stationary lasers 74, direct laser beams toward the outer surface 76 of blank buffer tube 70. The laser beams interact with the material of blank buffer tube 70 such that portions of the material of blank buffer tube 70 are removed forming helical depression pattern 36.

In the embodiment of FIG. 6, each stationary laser 74 is positioned at a different angular position around blank buffer tube 70 such that each stationary laser 74 forms the portions of the depression pattern on the portion of buffer tube outer surface 76 that is facing the particular laser 74. In general, each stationary laser 74 is activated in a predetermined timed sequence to form the desired depression pattern 36 while the buffer tube 70 translates through laser ablation station 72 in the direction of arrow 78.

In various embodiments, Applicant believes that by utilizing a laser based system, such as laser ablation station 72, a wider variety of patterns and depression shapes are formable as compared to other techniques such as contact cutting techniques and molding techniques. In addition, Applicant believes that by utilizing a laser based system, such as laser ablation station 72, depression patterns are formable on buffer tubes at higher speeds as compared to other techniques such as contact cutting techniques and molding techniques. In specific embodiments, Applicant believes that a laser based system, such as disclosed herein, can produce depression patterned buffer tubes at speeds up to 1000 meters per minute. In addition, multiplexing may enable higher speeds.

Referring to FIG. 7, formation of helical depression pattern 36 using a laser ablation station 80 is shown according to an exemplary embodiment. Laser ablation station 80 includes a rotary machine 82 coupled to and configured to rotate one or more mirrors, shown as mirrors 84 and 86. In general, a single laser 88 generates a laser beam 90 that interacts with mirrors 84 and 86. Mirrors 84 and 86 direct laser beam 90 around blank buffer tube 70 in the direction of arrow 92 such that laser beam 90 interacts with different portions of outer surface 76 of blank buffer tube 70 as blank buffer tube translates in the direction of arrows 94. In this manner, laser ablation station 80 forms helical depression pattern 36 using a single stationary laser, while using mirrors to direct laser beam 90 around the desired portions of outer surface 76 around the circumference of blank buffer tube 70.

In specific embodiments, mirrors 84 and 86 are faceted mirrors instead of conical mirrors which results in a laser beam 90 that stays circular at focus instead of elliptical. In other embodiments, mirrors 84 and 86 are conical mirrors providing a continuously moving focused spot on blank buffer tube 70. In one embodiment, use of non-continuous, facet mirrors 84 and 86 allows blank buffer tube 70 to split the two mirrors and not interact with laser 90. In another embodiment, blank buffer tube 70 is pulled through a guide to make the 90 degree turn shown in FIG. 7, and the guide protects blank buffer tube 70 from laser interaction allowing for use of conical/continuous reflection mirrors. In specific embodiments, rotary machine 82 is a servo driven system allowing for precise control of rotation speed.

While FIGS. 6 and 7 show specific systems and methods of forming a depression pattern in the outer surface of a buffer tube, other arrangements are possible. In one alternate embodiment, a single laser is mounted to a rotary machine that spins around blank buffer tube 70 to form pattern 36 around the entire circumference of the buffer tube. In another embodiment, a single stationary laser is used, and blank buffer tube 70 is rotated about its longitudinal axis during interaction with the laser beam to form pattern 36 around the entire circumference of the buffer tube.

While the specific cable embodiments discussed herein and shown in the figures relate primarily to cables and core elements that have a substantially circular cross-sectional shape defining substantially cylindrical internal lumens, in other embodiments, the cables and core elements discussed herein may have any number of cross-section shapes. For example, in various embodiments, the cable jacket and/or buffer tubes may have a square, rectangular, triangular or other polygonal cross-sectional shape. In such embodiments, the passage or lumen of the cable or buffer tube may be the same shape or different shape than the shape of the cable jacket and/or buffer tubes. In some embodiments, the cable jacket and/or buffer tubes may define more than one channel or passage. In such embodiments, the multiple channels may be of the same size and shape as each other or may each have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article, "a" is intended include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming an elongate optical transmission element comprising:
   moving a buffer tube surrounding an optical fiber into a laser ablation station;
   directing a laser beam toward an outer surface of the buffer tube; and
   removing portions of buffer tube with the laser beam forming a depression pattern along the outer surface of the buffer tube,
   wherein the step of directing the laser beam includes directing a laser with a rotating mirror to different portions of the outer surface of the buffer tube while translating the buffer tube past the rotating mirror.

2. The method of claim 1, wherein the depression pattern is a helical pattern extending in a helical shape around the outer surface of the buffer tube.

3. The method of claim 2, wherein the depression pattern is formed from a plurality of discreet depressions positioned in the helical pattern around the outer surface of the buffer tube, wherein each of the discreet depressions are separated from each other along the helical shape of the helical pattern by an original section of buffer tube having an original thickness.

4. The method of claim 1, wherein the laser beam is generated by a plurality of stationary lasers each positioned at a different angular position around the outer surface of the buffer tube, the method further comprising activating the stationary lasers in an alternating, timed sequence to form the depression pattern while translating the buffer tube past the stationary lasers.

* * * * *